N. B. PETTERSON.
Improvement in Dough Boards.
No. 120,394.            Patented Oct. 31, 1871.
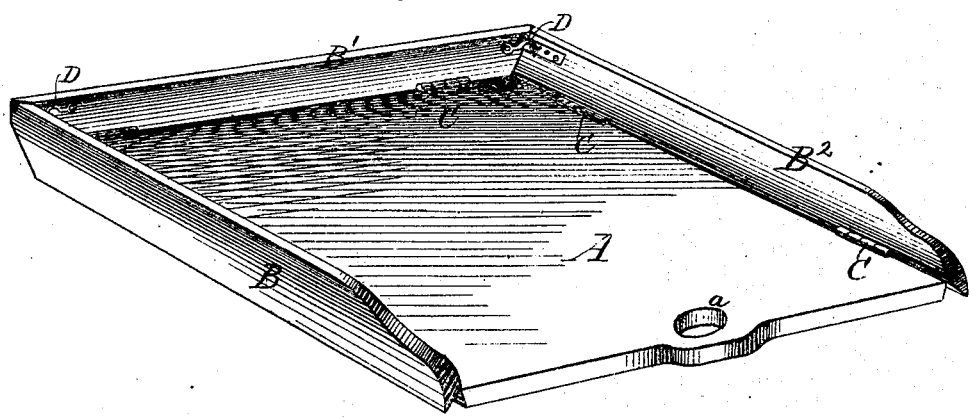
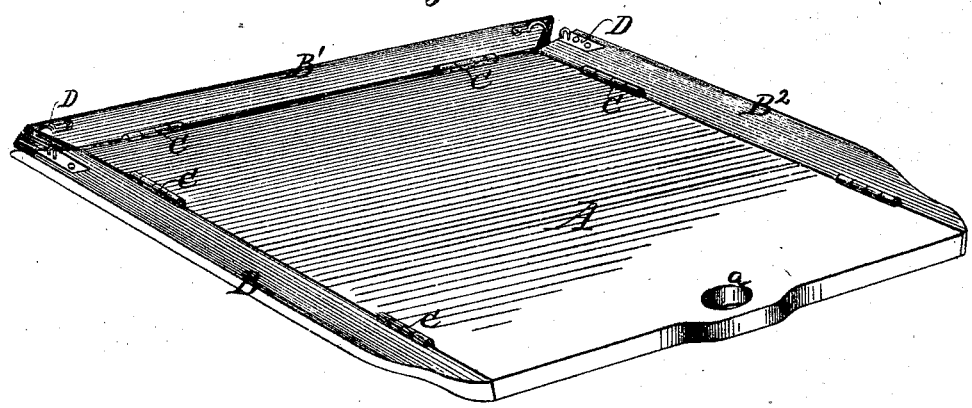
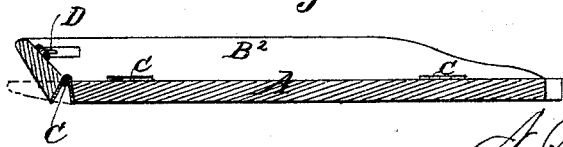

UNITED STATES PATENT OFFICE.

NILS B. PETTERSON, OF McGREGOR, IOWA.

IMPROVEMENT IN DOUGH-BOARDS.

Specification forming part of Letters Patent No. 120,394, dated October 31, 1871.

*To all whom it may concern:*

Be it known that I, NILS B. PETTERSON, of McGregor, in the county of Clayton and State of Iowa, have invented a certain new and useful Improvement in Dough-Boards; and I do hereby declare that the following is a full, clear, and exact description of the same, reference being had to the accompanying drawing making a part of this specification.

The nature of this invention consists in forming an upwardly-projecting rim around three sides of an ordinary board upon which dough is kneaded; said rim being hinged in sections to the edges of the board, so that they may be turned back when it is intended to roll the dough upon the board by a rolling-pin in making pies and other kinds of pastry.

Figure 1 is a perspective view of my improved dough-board. Fig. 2 is a similar view, showing the sections of the rim turned back. Fig. 3 is a section.

The same letters of reference are employed in all the figures in the designation of identical parts.

The board A is made of any preferred kind of wood, in a rectangular form, and at one end provided with an eye, $a$, by which it may be hung up. The other three sides of the board are constructed with upwardly-projecting rims B $B^1$ $B^2$, to prevent the soft dough from running off the board. These rims are attached to the board A by means of hinges C C, &c., the leaves of which should be screwed to the edges of the board and the respective rims so as to hide them as much as possible, in the manner clearly shown in the drawing. The rims are matched at the corners of the board, where they meet when turned up, and are there fastened together by hooks and staples D, or other convenient and well-known means, which sustain the rims in their upright positions, as seen in Fig. 1. When it becomes necessary to roll the dough into thin sheets by a rolling-pin the rims are turned down, as shown in Fig. 2.

What I claim as my invention, and desire to secure by Letters Patent, is—

A dough-board, A, constructed with hinged rims B $B^1$ $B^2$, substantially in the manner and for the purposes set forth.

In testimony whereof I have signed my name to this specification in the presence of two subscribing witnesses.

NILS B. PETTERSON.

Witnesses:
OLE HANSON,
A. LARSEN.